March 6, 1934.   G. B. PRATT   1,950,190
FLASH LIGHT
Filed Dec. 26, 1930   3 Sheets-Sheet 1
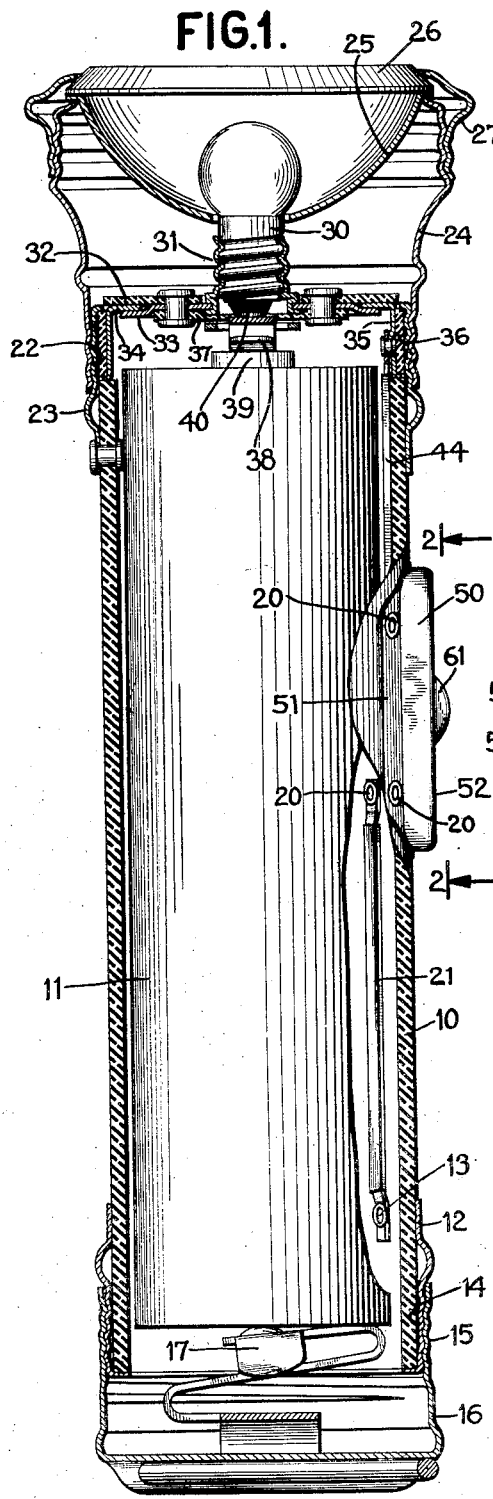
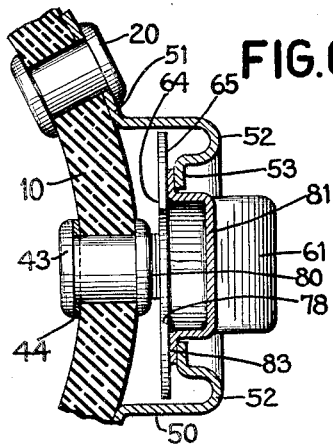
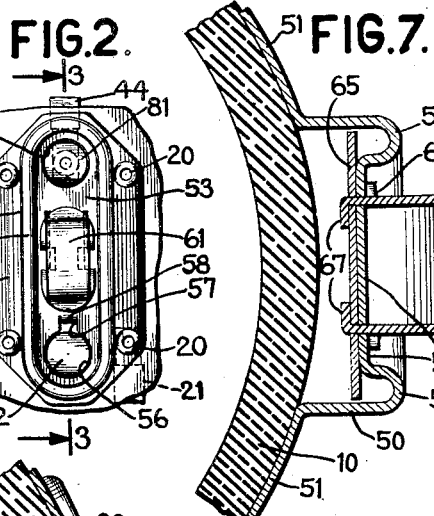
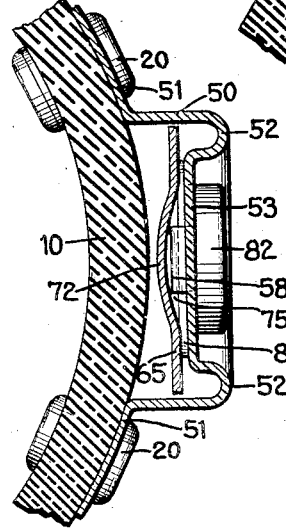
INVENTOR
GOODRICH B. PRATT
BY ATTORNEYS
Bohleber & Ledbetter

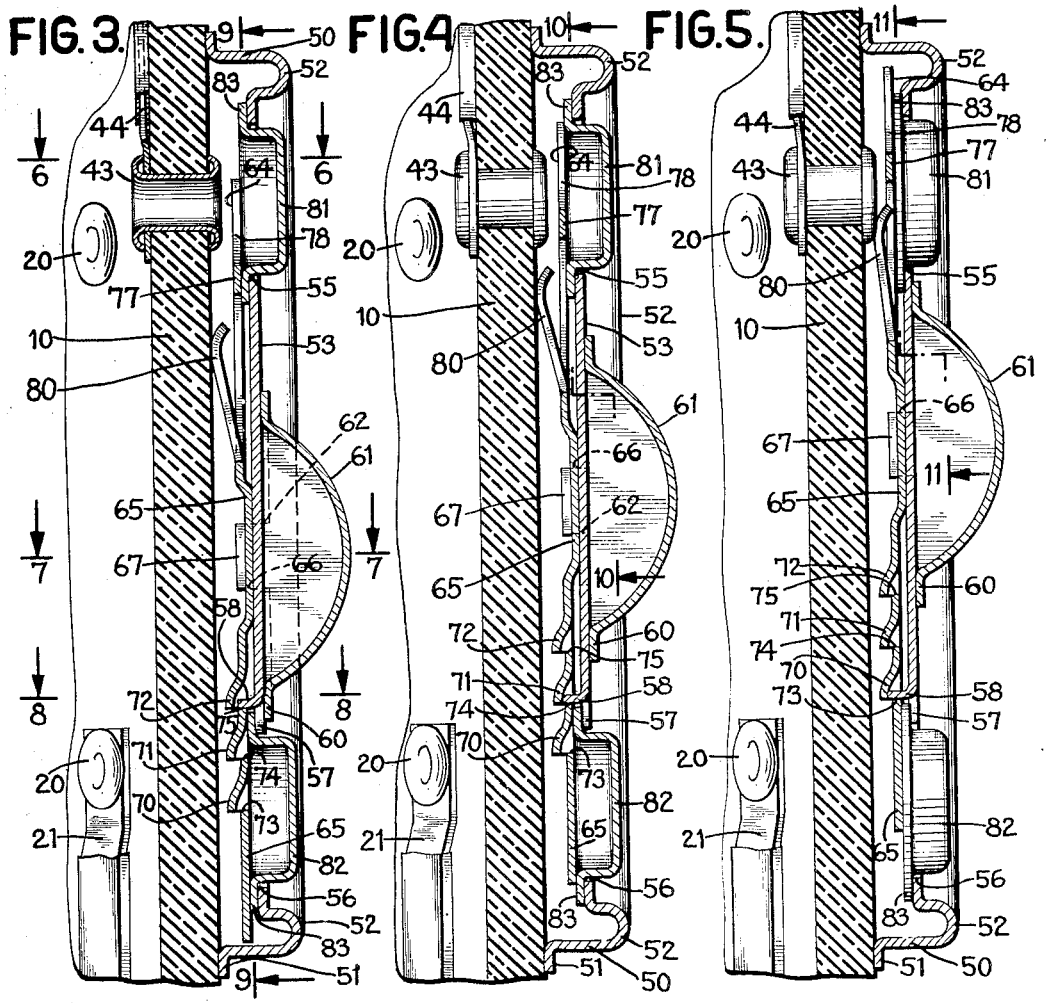

March 6, 1934.  G. B. PRATT  1,950,190
FLASH LIGHT
Filed Dec. 26, 1930  3 Sheets-Sheet 3
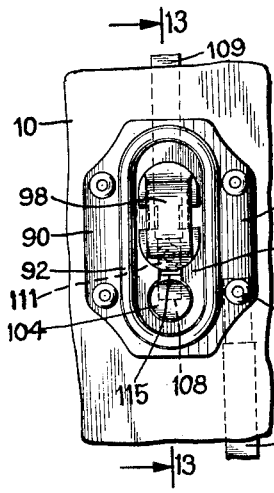
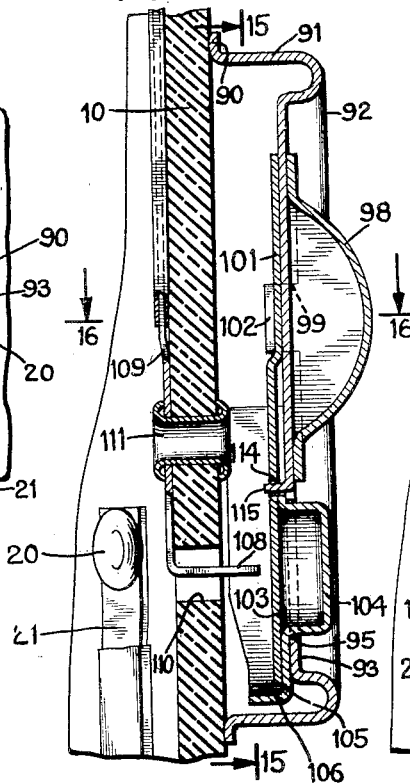
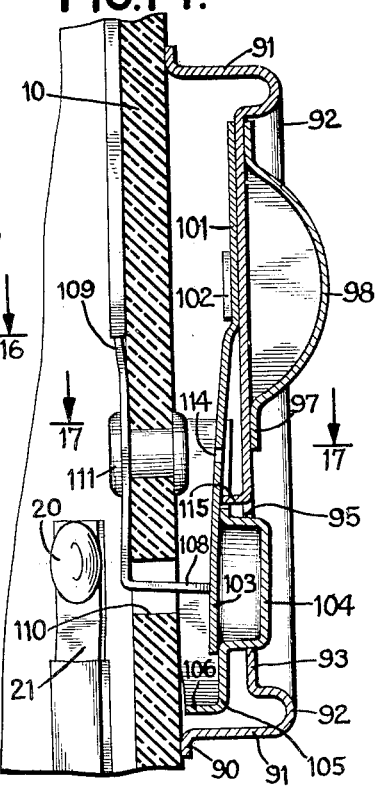
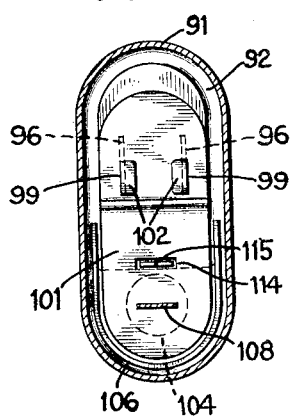
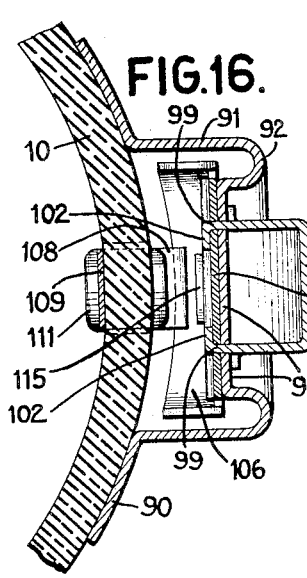
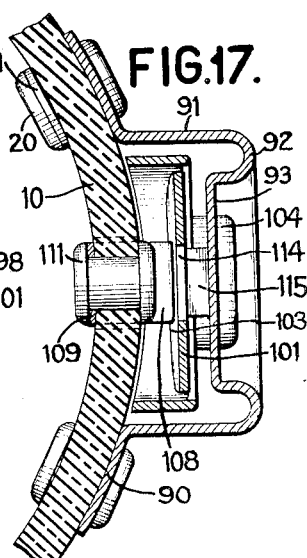
INVENTOR
GOODRICH B. PRATT
BY ATTORNEYS
Bohleber & Ledbetter Patented Mar. 6, 1934

1,950,190

UNITED STATES PATENT OFFICE 1,950,190

FLASH LIGHT

Goodrich B. Pratt, Grantwood, N. J., assignor to Bond Electric Corporation, Jersey City, N. J., a corporation of Delaware Application December 26, 1930, Serial No. 504,846

8 Claims. (Cl. 200—60)

This invention relates to electrical switches and more particularly to switches for electric flashlights, hand-lanterns and the like.

In flashlight constructions, it is customary to provide an inwardly movable member to close the electrical circuit and illuminate the lamp. This circuit closer has generally been provided with a lug or finger piece protruding outwardly of the flashlight casing for depression by the finger when, say, a momentary illumination or "flash" is desired. A slidable actuating member has also been provided which, in one position, engages and depresses the finger piece and/or the circuit closer to hold the circuit closed whereby a steady illumination of the lamp is attained. When such a flashlight is not in use and is carried, say, in a pocket or tool box, tools or other objects coming into contact with the inwardly movable member have accidentally depressed the same, thereby closing the contact and wasting the battery.

To overcome this objection, safety switches, so-called have been proposed wherein a slidable actuating member is movable between three positions, to wit, a safety position in which the slidable member is locked in open circuit position and depression of the circuit closer does not effect illumination of the lamp, a flash position in which the circuit may be momentarily closed at the will of the user and a position of steady light in which the circuit is held closed. The present invention has to do, generally, with safety switches of this kind.

One object of the present invention is the provision of a switch whereof the depression of the finger piece and/or circuit closer, when the slidable actuating member is at safety position, will not result in the closing of the circuit.

The invention also seeks a safety switch wherein the circuit closer is movable out of operable position in open circuit or safety position.

Another object of the invention is the locking of the slidable actuating member at each of the three positions of safety, flash and steady light.

Still another object of the invention is the provision of a supplemental contact member carried with the circuit closer for affording a steady illumination of the lamp.

Yet another object of the invention is the provision of a supplemental depressible member or finger piece adapted to release the slidable actuating member for movement between the different positions.

It is also an object of the invention to lock the circuit closer in each of the three positions, aforesaid.

In one of its aspects, the invention seeks to utilize the locking devices for the circuit closer as means retaining the circuit closer in closed circuit position.

The invention also has to do with a simplification of existing safety switches to attain a reduction in the number of parts while still retaining all of the safety features preventing accidental illumination of the lamp.

These and other objects of the invention and the means for their attainment will be more apparent from the following detailed description, taken in connection with the accompanying drawings illustrating two embodiments by which the invention may be realized, and in which:—

Figure 1 is a view in vertical section showing a flashlight to which the invention may be applied.

Figure 2 is a plan view of the switch structure taken on the line 2—2 of Figure 1 and looking in the direction of the arrows.

Figure 3 is a longitudinal, vertical sectional view of the switch of this invention, taken on the line 3—3 of Figure 2 and showing the parts in safety or open circuit position.

Figure 4 is a view similar to that of Figure 3, but showing the position of the parts of the switch in so-called flash position.

Figure 5 is a view also similar to that of Figure 3, but showing the position of the parts of the switch when a steady illumination of the lamp is attained.

Figure 6 is a transverse sectional view of the switch, taken on the line 6—6 of Figure 3, looking in the direction of the arrows, and showing details of the circuit closer and finger piece.

Figure 7 is a transverse sectional view of the switch, taken on the line 7—7 of Figure 3, looking in the direction of the arrows, and showing details of the combined slidable actuating member and circuit closer.

Figure 8 is a transverse sectional view, taken on the line 8—8 of Figure 3, looking in the direction of the arrows, and showing details of the locking devices for the combined slidable actuating member and circuit closer.

Figure 9 is an horizontal sectional view of the switch taken on the line 9—9 of Figure 3 and showing the relation of the circuit closer to the switch contact in open circuit or safety position.

Figure 10 is a fragmentary, horizontal sectional view, taken in the planes indicated by the broken line 10—10 of Figure 4, and showing the relation of the circuit closer to the switch contact in flash position.

Figure 11 is a fragmentary, horizontal sectional view, taken in the planes indicated by the broken line 11—11 of Figure 5 and showing the relation of the circuit closer to the switch contact in the position for steady light.

Figure 12 is a plan view of a modification of the switch shown in Figures 1 to 11, whereof the slidable actuating member is movable between a flash position and a position of steady light, and is locked in the flash position.

Figure 13 is a longitudinal sectional view, taken on the line 13—13 of Figure 12, looking in the direction of the arrows, and showing the slidable actuating member in flash position.

Figure 14 is a view similar to Figure 13, but showing the position of the parts for steady light.

Figure 15 is an horizontal sectional view taken in the plane indicated by the line 15—15 of Figure 13 and showing details of the combined slidable actuating member and circuit closer.

Figure 16 is a transverse sectional view, taken on the line 16—16 of Figure 13 and looking in the direction of the arrows, and showing details of the slidable actuating member.

Figure 17 is a transverse sectional view, taken in the planes indicated by the broken lines 17—17 of Figure 14 and looking in the direction of the arrows and showing details of the circuit closer and switch contact.

Referring first to Figure 1, the invention is shown as applied to a flashlight having a tubular battery containing casing 10 here illustrated as of fibre or other non-metallic or non-conductive material, within which casing 10 one or more dry cells forming the battery 11 are disposed. Obviously, the flashlight casing 10 may be made of metal, it being merely necessary in such case to provide insulation between certain of the parts, as will be understood by those skilled in the art. Each end of the flashlight casing is provided with threads. As shown, a bottom cap collar 12 is secured, as by rivets or eyelets 13, to the lower end of the flashlight casing 10 and is formed with threads 14 for the reception of the threaded end 15 of the bottom cap 16. The bottom cap 16 may be of any convenient form and provided with any desired battery contact element, here shown as a resilient member 17 seated within the bottom cap 16 and bearing against the bottom of the dry cell to urge the top-most battery terminal 39 upwardly against the contact 38 of the lamp socket support in the upper part of the casing, the bottom cap spring 17, bottom cap 16 and bottom cap collar 12 serving as conductive elements in the electrical circuit including the negative terminal of the battery 11, the circuit being continued to the switch housing 50 by means of an electrical conductor 21 extending from one of the rivets or eyelets 13 securing the bottom cap collar 12 on casing 10 to one of the rivets 20 securing the switch housing 50 to the casing 10. At the upper end of the flashlight, the casing 10 is shown as provided with threads 22 formed on the hood collar 23 secured in any convenient fashion to the casing. Removably threaded to the hood collar 23, is the hood 24 which supports the reflector 25 and lens 26 which are retained thereon by means of the lens ring 27. The base 30 of the lamp is carried in a lamp socket 31 mounted upon a lamp socket support in the form of a fibre disc 32, removably mounted on the upper end of the flashlight. The fibre disc 32 carries a conductive member in electrical connection with the lamp socket 31 and formed with portions 33 adapted to interengage with flange portions 34 on an annular member 35 carried on the end of the fibre casing; insulated from the hood collar 23 by a fibre ring 36, and secured to the end of the casing by an inturned flange on the end of the hood collar 23. Carried beneath the lamp socket support 32, 33, and insulated therefrom by a centrally apertured fibre disc 37 is a yielding or shock absorbing central contact member 38 adapted to be engaged by the central or positive terminal 39 of the battery 11 and having a portion thereof engaged by the central terminal 40 of the lamp. The other or annular terminal of the lamp base 30 is in electrical connection with the annulus 35 on the flashlight casing 10 through the socket 31 and conductive member 33 which is electrically connected with a switch contact within the housing 50 here shown as an eyelet 43 which secures one end of the electrical conductor 44 leading to the annulus 35. The parts hereinbefore described, other than the switch, are either well known or form the subject matter of co-pending applications and, forming no part of the present invention, are described briefly merely for the purpose of a general understanding of the invention and the electrical circuit to be closed.

The switch in accordance with this invention comprises an housing 50 secured outwardly of the flashlight casing 10, which housing is of generally elongated shape and has a flange 51 about its periphery by which it is secured to the casing 10 by the rivets 20. The housing 50 encloses the switch contact 43 and, being of metal, forms a part of the electrical circuit including the conductor 21. The top of the housing is provided with a peripheral bead 52 formed in the top thereof and defining a recessed or sunken top portion 53 within the bead 52. At each end, the top 53 is formed inwardly of the bead 52 with an aperture 55 at the front end and an aperture 56 at the rear end of the housing. The forward end of the rear aperture 56 is slotted as at 57 and the material punched out of the slot is pressed downwardly as a locking finger 58.

Slidably on the outer surface of the depressed porton 53 is a slide or actuating member 60 having an outwardly pressed portion 61 intermediate its ends forming a protuberance readily engaged by the finger and by which the actuating member is manipulated. At each side intermediate the ends, the slide 60 is formed with tongues 62 adapted to pass through and be guided in longitudinally extending slots 63 formed in the top 53 of the housing 50 intermediate the apertures 55 and 56.

Immediately beneath the top of the housing is a conductive slidable circuit closing and locking member 65 which is formed with slots or apertures 66 in register with the slots 63 in the housing and receives the tongues 62, the ends of the tongues being bent immediately therebeneath as at 67 intermediate the ends of member 64, 65, to unite the lockable circuit closer 64, 65 and the slide 60 whereby reciprocation of the slide carries with it the circuit closer member 64, 65 and they move as a unit. Three stops are carried by the locking end or arm 65 of the circuit closer which are formed by cutting and pressing downwardly portions of the locking end 65, as cams, indicated at 70, 71 and 72, the underformed transverse edges 73, 74 and 75 forming the stops. These stops 73, 74 and 75 are so positioned that when engaged, respectively, by the locking finger 58, the circuit closer arm 64 will be in one of the three positions of safety, flash and steady light. At the end, centrally, the circuit closer end 64 is cut out in substantially semi-circular form, as at 78, the area cut out being greater in extent than the switch contact 43, so that when the stop 75 is engaged by the locking finger 58, as shown in Figure 3, the cut-out 78 will be in register with the switch contact 43 and any depression of the circuit closer arm 64 will cause the metal thereof to contact only with the non-metallic casing and be out of contact with the metallic switch terminal 43 so that no current can flow from the casing 40 to contact 43 and the lamp will not be illuminated.

More remote from the circuit closer portion 64 is a stop 74. This stop is so positioned that when engaged by the locking finger 58, the metal of the circuit closer at 77 overlies a portion at least of switch contact 43, as shown in Figure 4, and forms circuit closer contact for use in obtaining a flash of the light at the will of the user. Thus, in this position, when the finger piece 81 is depressed, the contact 77 is carried inwardly into engagement with the switch contact 43 and the circuit is closed and the lamp illuminated so long as the contact is depressed.

Inwardly of the cut-out 78 a portion of the circuit closing end 64 is shown as punched out into a contact finger 80 depressed downwardly to normally engage and slide along the casing 10, the end 80 being curved slightly upwardly so as to ride easily over onto the eyelet 43 when the parts are in the position of steady light shown in Figure 5, as will be explained.

Carried in the respective apertures 55 and 56 are cup shaped finger pieces 81 and 82, respectively, formed with peripheral flanges 83. Finger piece 81 is disposed in the forward aperture 55 immediately above the switch contact 43, the flange resting upon the contact end 64 so that the finger piece 81 is held between the contact end 64 and the top 53 of the housing. It will be noted that accidental depression of the finger piece 81 is practically impossible, even though the flashlight be placed in a tool box with the actuating member locked in the flash position illustrated in Figure 4, because the upper or outer surface of finger piece 81, in all positions, is below the outer marginal surface of the bead 52, which thus serves as a guard therefor. The finger piece 82 is similarly disposed in the rear aperture 56 with its flange between the locking end of the circuit closer and the top of the housing underlying the edges of the aperture 56. The top surface of this finger piece is also below the outer marginal surface of the guard 52 so that accidental depression of the finger piece, which would result in depressing the locking end 65 and release the slide 60, is also practically impossible in all positions.

The operation of the safety switch will now be described:—

Referring now to Figure 3, illustrating the safety or open circuit position of the switch, it will be observed that the slidable actuating member 60—61 is in its rearmost position with the innermost or safety shoulder 75 engaged by the locking finger 58, the inherent resiliency of the locking end 65 retaining the parts in locking engagement. In this position, the cut-out 78 is in register with the switch contact 43 and should the circuit closer end 64 be carried downwardly by accidental depression of the circuit closer finger piece 81, the circuit closer 64 will be out of contact with the switch contact 43 as shown in Figure 9 and the lamp will not be illuminated. It will also be noted that the contact finger 80 is well away from the switch terminal 43.

If, now, it is desired to illuminate the lamp momentarily by depressing the finger piece 81 as desired, the actuating slide 60 is moved to the position shown in Figure 4. This movement is made possible by depressing the locking finger piece 82 to thereby carry the locking end 65 downwardly until the shoulder 75 is below the end of the locking finger 58, whereupon the slide can be advanced to flash position by pressure of the finger on the finger engaging part 61. So soon as the shoulder 75 passes beneath the locking finger 58, pressure on the finger piece 82 may be relieved, allowing the locking end 65 to move upwardly due to its inherent resiliency and as the slide 60 moves forwardly under the pressure of the finger, the locking finger 58 rides over the depressed cam portion 71 and is guided into engagement with the shoulder 74, as shown in Figure 4. The slide is thus locked in flash position and the circuit closer contact 77 is disposed immediately above the switch contact 43, as shown in Figure 10, so that depression of the finger piece 81, which rests upon the circuit closer 64, will carry the circuit closer contact 77 downwardly into contact with the switch contact 43 and, so long as pressure is applied to the finger piece 81, the circuit will be closed and the lamp illuminated. The path of electric current in this position is traced from the conductor 21 through the housing 50, the metallic locking circuit closer 64, circuit closer contact 43 to the conductor 44. As soon, however, as the finger is removed from the finger piece 81, i. e., the pressure thereon relieved, the inherent resiliency of the circuit closer 64 will carry it out of contact with the switch contact 43 to the position shown in Figure 4, when the circuit will be interrupted.

When it is desired that the lamp be illuminated continuously, i. e., a steady light emitted by the flashlight, the parts are moved to the position shown in Figure 5. This is again effected by depressing the locking finger piece 82 to carry the shoulder 74 below the locking finger 58 and moving the combined slide and circuit closer forwardly to the position shown in Figure 5. So soon as the shoulder 74 is carried beneath the end of the locking finger 58, the locking finger may be permitted to ride over the depressed cam portion 70 and the combined slide and circuit closer moved forwardly until the locking finger engages the shoulder 73. In this position, the contact finger 80 has been moved into engagement with the switch contact 43. By reason of the resiliency of the contact finger 80, it is normally held downwardly against the flashlight casing and/or the contact 43 and the circuit is held closed so long as the parts are in this position. The path of electric current in this position is traced from the conductor 21 through housing 50, locking circuit closer 64, 65, contact finger 80 to the contact 43 and from thence to the conductor 44.

To return the switch to flash or open circuit position, it is merely necessary to move the slide rearwardly, i. e., toward the right in Figures 3, 4 and 5, the depressed portions 70, 71 and 72 riding easily over the end of the locking finger 58 in sequence until the shoulder 75 is reached. Further movement of the slide is prevented by the fact that the ears 62 thereon reach the rearward ends of the slots 63 in the housing.

A modified form of switch patterned after that illustrated in Figures 1 through 11, but wherein the actuating member is movable between but two positions, is illustrated in Figures 12 through 17. The actuating member assumes the same position for open circuit and flash positions. The slide is, however, locked in flash position and the parts are so related as to render it difficult to accidentally depress the circuit closer in either position. As before, the conductor 21, leading from the bottom cap collar 12 is secured to the eyelet 20 by which the flange 90 of the switch housing 91 is secured to the casing 10. Thus the housing is included in the electrical circuit. The housing 91 is elongated and, as before, is provided with a circumferential bead 92 defining a depressed top portion 93. At the rear only, in this modification, the top 93 of the housing is formed with an aperture 95 and forwardly of the aperture with a pair of spaced slots 96 extending longitudinally of the casing. The actuating member 97 also has an outwardly pressed finger engaging portion 98 and on each side thereof a tongue 99 passes downwardly through and is guided in one of the slots 96 in the housing. The tongues are bent under a circuit closer in the form of an elongated conductive or metallic strip 101, as at 102 underneath the housing top 93 so that the slide 97 and circuit closer move as a unit and the circuit closer, being in contact with the housing, is included in the flashlight circuit. As seen in the drawings, the circuit closer 101 is secured near one end, the other end 103 being free to function as a leaf spring. Between the circuit closer end 103 and the top 93 of housing 91, there is disposed a finger piece having an inverted cup shaped portion 104 disposed in the aperture 95 and having an outwardly extending flange 105 which engages the top 93 around the aperture 95. This flange 105 is supported on the circuit closer end 103. The flange carries, along either side of the circuit closer 103 and across the end thereof, a downwardly extending flange or limit stop 106. When the finger piece 104 is depressed, the circuit closer 103 is carried downwardly into contact with the bared end 108 of a conductor strip 109 passing into the housing 91 through an aperture 110 formed in the casing 10. The conductor 109 leads to the conductive annulus 35 and its lower end is conveniently secured to the flashlight casing 10 by an eyelet 111 which is disposed at a sufficient distance from the aperture 110 so that the inherent resiliency of the strip 109 causes the end thereof to act like a spring and tends to return the end 108 outwardly within the housing 91 after it has been engaged and depressed by the circuit closer 108.

The circuit closer 103 is also formed with an aperture, say, a slot 114 adapted to receive a locking finger 115 punched downwardly out of the top 93 when the parts are in the flash position shown in Figure 13. It will be observed that the top of the finger piece 104 is well below the peripheral bead 92 as shown in Figure 13, so that it is practically impossible for an object to accidentally come in contact with the finger piece 104 and depress it. The depression 93 is, however, of sufficient width to receive the finger and permit the finger piece 104 to be depressed thereby. Depression of the finger piece 104 carries with it the circuit closer 103 and brings the same into contact with the switch contact 108, thereby closing the circuit from the conductor 21 through the eyelet 20, the housing 91, and circuit closer 103 to the conductor 109. The limit stop 106 on the finger piece 104 protects the end 108 from injury since it limits the extent to which the switch contact 108 can be depressed by the circuit closer. As seen in Figure 14, depression of the circuit closer into contact with the switch contact depresses the switch contact slightly, the switch contact being yieldingly held against the yielding circuit closer, thus insuring a positive electrical connection between the circuit closer and the switch contact and affording a wiping contact whereby clean contacting surfaces are assured. So soon as pressure on the finger piece 104 is relieved, the inherent resiliency of the circuit closer 103 returns the same to a position adjacent the housing top 93 as shown in Figure 13, with the locking finger 115 engaged in the aperture 114 and in which position the circuit closer is spaced from the switch contact 108 and the circuit is open. It will also be observed that in this position longitudinal pressure on the movable actuating member 97 will be ineffective to slide the combined actuating member and circuit closer since the locking finger 115 prevents movement thereof.

When, however, it is desired to obtain a steady illumination, the finger piece 104 is depressed thereby carrying the circuit closer 103 below the end of the locking finger 115, whereupon the slide 97 may be moved forwardly to the position shown in Figure 14 by pressure on the finger engaging part 98. So soon as the circuit closer is disengaged from the locking finger 115, pressure on the finger piece 104 may be relieved as the circuit closer 103 slides along under the end of the locking finger 115 and is held down thereby at a constant angle until its end is brought yieldingly into engagement with the switch contact 108, sometimes slightly depressing the switch contact as shown in Figure 14, against the resiliency thereof, as before described. The locking finger 115 holds the circuit closer against the switch terminal 108 and thereby keeps the circuit closed. Here again, the stop 106 limits the downward movement of the finger piece and prevents injury to the switch contact. To return the switch to off position, it is merely necessary to move the slide in the opposite direction or back to the position shown in Figure 13, the circuit closer sliding along under the end of the locking finger 115 until the aperture 114 registers therewith, whereupon the finger 115 slips through the aperture allowing the circuit closer to return out of contact with the switch terminal 108 by reason of its inherent resiliency and the switch is then locked in a combined open circuit and flash position.

Use throughout the foregoing description of such terms as "top" and "bottom", "upper" and "lower", "inwardly" and "outwardly", "forwardly" and "rearwardly" and the like is made in a relative sense only and not by way of limitation.

It will thus be seen that a safety switch for flashlights has been provided which is extremely simple of construction, is composed of few parts and is provided with means for locking the same in open circuit and/or safety position. The relation of parts is such as to substantially prevent inadvertent closing of the circuit and the wasting of the battery. The combined circuit closer and actuating member is movable between the several positions, one of which, may, if desired, be a combined safety or open circuit position and a portion of the circuit closer is availed of as a co-operating locking element to prevent accidental movement except when a predetermined movement of a finger piece releases the combined member for movement, the said finger piece being normally protected against accidental contact by a peripheral flange on the housing.

Various modifications will occur to those skilled in the art in the composition, disposition and configuration of the component elements going to make up the invention as a whole, as well as in the selection and/or combination of certain of the features independently of others, and no limitation is intended by the phraseology of the foregoing specification or illustrations in the accompanying drawings, except as indicated in the appended claims.

What is claimed is:—

1. A safety switch comprising a housing, a switch contact within the housing, said housing being formed with spaced apertures and spaced slots extending longitudinally thereof between the apertures, a movable actuating member outwardly of the housing having tongues passing through the slots, a resilient strip within the housing and engaged by the tongues whereby said member and strip move as a unit, finger pieces in the respective apertures supported by said strip upon opposite sides of the tongues, respectively, said strip comprising a circuit closer arm and a locking arm, said locking arm being formed with a series of stops corresponding to safety, flash and steady light positions and the housing having a locking finger pressed inwardly therefrom to engage the stops, respectively, said circuit closer arm being cut away to avoid contact with the switch contact when the locking arm is in safety position, said contact arm being adapted to contact with said switch contact in flash position, and a downwardly extending contact finger stamped out of said circuit closer arm and adapted to contact with said switch contact when the locking finger is in engagement with the stop corresponding to steady light.

2. A safety switch comprising a housing, a switch contact within the housing, said housing being formed with spaced apertures and spaced slots extending longitudinally thereof between the apertures, a slide outwardly of the housing having tongues passing through the slots, a resilient strip within the housing and engaged by the tongues whereby the slide and strip move as a unit, finger pieces in the respective apertures supported by said strip, said strip comprising a circuit closer arm and a locking arm, said locking arm being formed with a series of stops corresponding to safety, flash and steady light positions and the housing having a locking finger pressed inwardly therefrom to engage the stops, respectively, said circuit closer arm being cut away to avoid contact within the switch contact when the locking arm is in safety position, said contact arm being adapted to contact with said switch contact in flash position, and a downwardly extending contact finger carried with said circuit closer and adapted to contact with said switch contact when the locking finger is in engagement with the stop corresponding to steady light.

3. A safety switch comprising a housing, a switch contact within the housing, a slide outwardly of the housing, a resilient strip within the housing and operatively connected with the slide to move as a unit therewith, said strip comprising a circuit closer arm and a locking arm, said locking arm being formed with a series of stops corresponding to safety, flash and steady light positions and the housing having a locking finger pressed inwardly therefrom to engage the stops, respectively, means to depress said arms, respectively, said circuit closer arm being cut away to avoid contact with the switch contact when the locking arm is in safety position, said contact arm being adapted to contact with said switch contact in flash position, and a downwardly extending contact finger stamped out of said circuit closer and adapted to contact with said switch terminal when the locking finger is in engagement with the stop for steady light.

4. A safety switch comprising a housing, a switch contact within the housing, said housing being formed with spaced apertures and spaced slots extending longitudinally thereof between the apertures, a slide outwardly of the housing having tongues passing through the slots, a resilient strip within the housing and operatively connected with the slide to move as a unit therewith, said strip comprising a circuit closer arm and a locking arm, said locking arm being adapted to be locked in safety, flash and steady light positions, respectively, said circuit closer arm being adapted to avoid contact with the switch contact when the locking arm is in safety position, said contact arm being adapted to contact with said switch terminal in flash position, and means adapted to contact with said switch contact when the circuit closer is locked in the position of steady light.

5. A safety switch comprising a housing, a switch contact within the housing, said housing being formed with spaced apertures, an actuating member movable outwardly of the housing, a resilient strip within the housing, said member and strip being movable as a unit, said strip comprising a circuit closer end and a locking end accessible, respectively, through said apertures, means carried with the housing to lock the locking end in safety, flash and steady light positions, respectively, said circuit closer end being cut away to avoid contact within the switch contact when the locking arm is in safety position, said contact arm being adapted to contact with said switch contact in flash position, and said circuit closer having a downwardly extending contact finger adapted to contact with said switch contact when the locking finger is locked for steady light.

6. A safety switch comprising a housing, a switch contact within the housing, said housing being formed with spaced apertures and spaced slots extending longitudinally thereof between the apertures, a slide outwardly of the housing having tongues passing through the slots, a resilient strip within the housing and engaged by the tongues whereby the slide and strip move as a unit, finger pieces in the respective apertures supported by said strip, said strip comprising a circuit closer end and a locking end, said locking end being adapted to be locked in safety, flash and steady light positions, respectively, said circuit closer end being cut away to avoid contact within the switch terminal when the locking arm is in safety position, said contact arm being adapted to contact with said switch terminal in flash position, and a downwardly extending contact finger stamped out of said circuit closer and adapted to contact with said switch terminal when the locking finger is in engagement with the stop for steady light.

7. A safety switch comprising a housing, a switch contact within the housing, a resilient strip within the housing, said strip comprising a circuit closer end and a locking end, said locking end being formed with a series of stops corresponding to safety, flash and steady light positions, respectively, and the housing having means to engage the stops, respectively, said circuit closer end being cut away to avoid contact within the switch contact when the locking arm is in safety position, said contact arm being adapted to contact with said switch contact in flash position, and a downwardly extending contact finger stamped out of said circuit closer and adapted to contact with said switch contact when the locking finger is in engagement with the stop for steady light.

8. A safety switch comprising a housing, a switch contact within the housing, said housing being formed with spaced apertures and spaced slots extending longitudinally thereof between the apertures, a movable actuating member outwardly of the housing having tongues passing through the slots, a resilient strip within the housing and engaged by the tongues whereby said member and strip move as a unit, finger pieces in the respective apertures supported by said strip upon opposite sides of the tongues, respectfully, said strip comprising a circuit closer arm and a locking arm, said locking arm being formed with a stop, and the housing having a locking finger pressed inwardly therefrom to engage the stop, said circuit closer arm being cut away to avoid contact with the switch contact when the locking arm is in one position, said contact arm being adapted to contact with said switch contact in another position, and a downwardly extending contact finger stamped out of said circuit closer arm and adapted to contact with said switch contact in another position when the locking finger is in engagement with the stop corresponding to steady light.

GOODRICH B. PRATT.